(12) United States Patent
Deckmyn et al.

(10) Patent No.: US 12,459,489 B2
(45) Date of Patent: Nov. 4, 2025

(54) SYSTEMS AND METHODS FOR ELECTRIC DRIVELINE CONTROL

(71) Applicant: Dana Belgium N.V., Flanders (BE)

(72) Inventors: Peter Deckmyn, Koekelare (BE); Biagio Borretti, Modena (IT); Tony Libbrecht, Waregem (BE)

(73) Assignee: DANA BELGIUM N.V., Bruges (BE)

( * ) Notice: Subject to any disclaimer, the term of this patent is extended or adjusted under 35 U.S.C. 154(b) by 274 days.

(21) Appl. No.: 18/313,938

(22) Filed: May 8, 2023

(65) Prior Publication Data
US 2024/0034301 A1 Feb. 1, 2024

Related U.S. Application Data

(60) Provisional application No. 63/369,740, filed on Jul. 28, 2022.

(51) Int. Cl.
*B60W 20/15* (2016.01)
*B60L 15/20* (2006.01)

(52) U.S. Cl.
CPC .......... *B60W 20/15* (2016.01); *B60L 15/20* (2013.01); *B60L 2240/12* (2013.01); *B60L 2240/14* (2013.01); *B60L 2240/30* (2013.01); *B60L 2240/429* (2013.01); *B60W 2510/08* (2013.01); *B60W 2510/188* (2013.01); *B60W 2520/00* (2013.01)

(58) Field of Classification Search
CPC ............ B60W 20/15; B60W 2510/08; B60W 2510/188; B60W 2520/00; B60L 15/20; B60L 2240/12; B60L 2240/14; B60L 2240/30; B60L 2240/429
See application file for complete search history.

(56) References Cited

U.S. PATENT DOCUMENTS

| | | | |
|---|---|---|---|
| 6,307,277 B1 * | 10/2001 | Tamai | B60W 10/06 |
| | | | 290/40 C |
| 9,140,337 B2 * | 9/2015 | Sah | B60W 10/06 |
| 9,460,628 B2 | 10/2016 | Oppelland et al. | |
| 9,688,284 B2 | 6/2017 | Pongracz et al. | |
| 2009/0054206 A1 * | 2/2009 | Tamba | F16H 61/143 |
| | | | 477/61 |

FOREIGN PATENT DOCUMENTS

CN 104590243 B 3/2017

\* cited by examiner

*Primary Examiner* — Gertrude Arthur Jeanglaude
(74) *Attorney, Agent, or Firm* — McCoy Russell LLP

(57) ABSTRACT

Methods and systems are provided for reducing vehicle movement during standstill. In one example, a method for a hybrid or electric vehicle may include monitoring a requested torque of an electric machine and a clutch position, predicting a torque at an output shaft by multiplying the requested torque and clutch position, and operating the hybrid or electric vehicle in a default state in response to an indication of a predicted torque exceeding a threshold torque.

18 Claims, 5 Drawing Sheets

SYSTEMS AND METHODS FOR ELECTRIC DRIVELINE CONTROL

CROSS REFERENCE TO RELATED APPLICATION

The present application claims priority to U.S. Provisional Application No. 63/369,740, entitled "SYSTEMS AND METHODS FOR ELECTRIC DRIVELINE CONTROL", and filed on Jul. 28, 2022. The entire contents of the above-listed application are hereby incorporated by reference for all purposes.

TECHNICAL FIELD

The present description relates generally to methods and systems for controlling an electric or hybrid electric vehicle at standstill.

BACKGROUND AND SUMMARY

Drivers may exit a vehicle at standstill. For example, a driver may put a vehicle in a neutral gear and exit the vehicle for a duration. While the vehicle is in neutral, control systems may be implemented to maintain the vehicle stationary until the driver returns to the vehicle and issues a new command. For vehicles with an internal combustion engine, monitoring and reducing vehicle movement at standstill may be controlled variously. In one example, some vehicles with an internal combustion engine may control vehicle movement at standstill by monitoring an actual throttle level setting against a selected throttle setting. In response to an indication of increasing actual throttle level, a control system may disconnect the engine output from the vehicle wheels. As one example, the control system may transmit an electrical signal to a clutch actuator for opening one or more clutches.

For electric and hybrid electric vehicles, power may come from the battery system, the combustion engine, or flow between both without affecting motion. To accommodate multiple power sources, alternative control strategies may be used to monitor driveline components, such as an electric gearbox. In one example, the control system may monitor a torque setting function of an inverter controller of an electric machine of the electric gearbox. However, monitoring the torque setting is complicated and expensive. Additionally, movement control may be more reliable when the driveline operation and monitoring function controls operate independently. In some examples, movement control systems may be less effective when monitored signals are too broad.

In one example, the issues described above may be addressed by a method for a hybrid or electric vehicle including, monitoring a requested torque of an electric machine and a clutch position, predicting a torque at an output shaft by multiplying the requested torque and clutch position, and operating the hybrid or electric vehicle in a default state in response to the predicted torque exceeding a threshold torque. In this way, movement at standstill may be controlled.

As one example, the predicted torque may be calculated from a torque requested by an inverter of the electric machine. As another example, the predicted torque may be calculated by measuring a DC current to the electric machine. As another example, the method may include monitoring a speed of the vehicle, deriving an acceleration of the vehicle in response to an indication of the speed exceeding a threshold speed, and putting the vehicle in a default state in response to an indication of acceleration being greater than a threshold acceleration. As another example, the method may include monitoring a status of a parking brake of the vehicle. In this way, simple, independent control strategies may work synergistically to monitor and reduce movement at standstill.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for driveline control for an electric or hybrid electric vehicle, particularly while the vehicle is at standstill. In some examples, movement control at standstill may include controlling a torque setting function of an inverter of an electric machine component of a gearbox. However, torque setting control may be complex and expensive. For example, torque setting control relies on a variety of parameters that influence the delivered torque, such as battery voltage, electric motor temperature, motor speed, and system age. To monitor the actual torque for standstill control, a coarse but simple and reliable algorithm that uses fewer parameters is preferred. The disclosure includes independent strategies for monitoring and reducing vehicle motion that may be operated concurrently for reliable movement control at standstill. In one example, the disclosure herein describes a method for controlling a torque monitoring function of the inverter controller of the electric machine of the vehicle. Torque monitoring control may be less complex than torque setting control. As another example, the disclosure herein describes a method for movement control including monitoring a speed of the vehicle. As another example, including a third strategy for verifying a park brake setting may provide additional, independent control.

Figure 1:
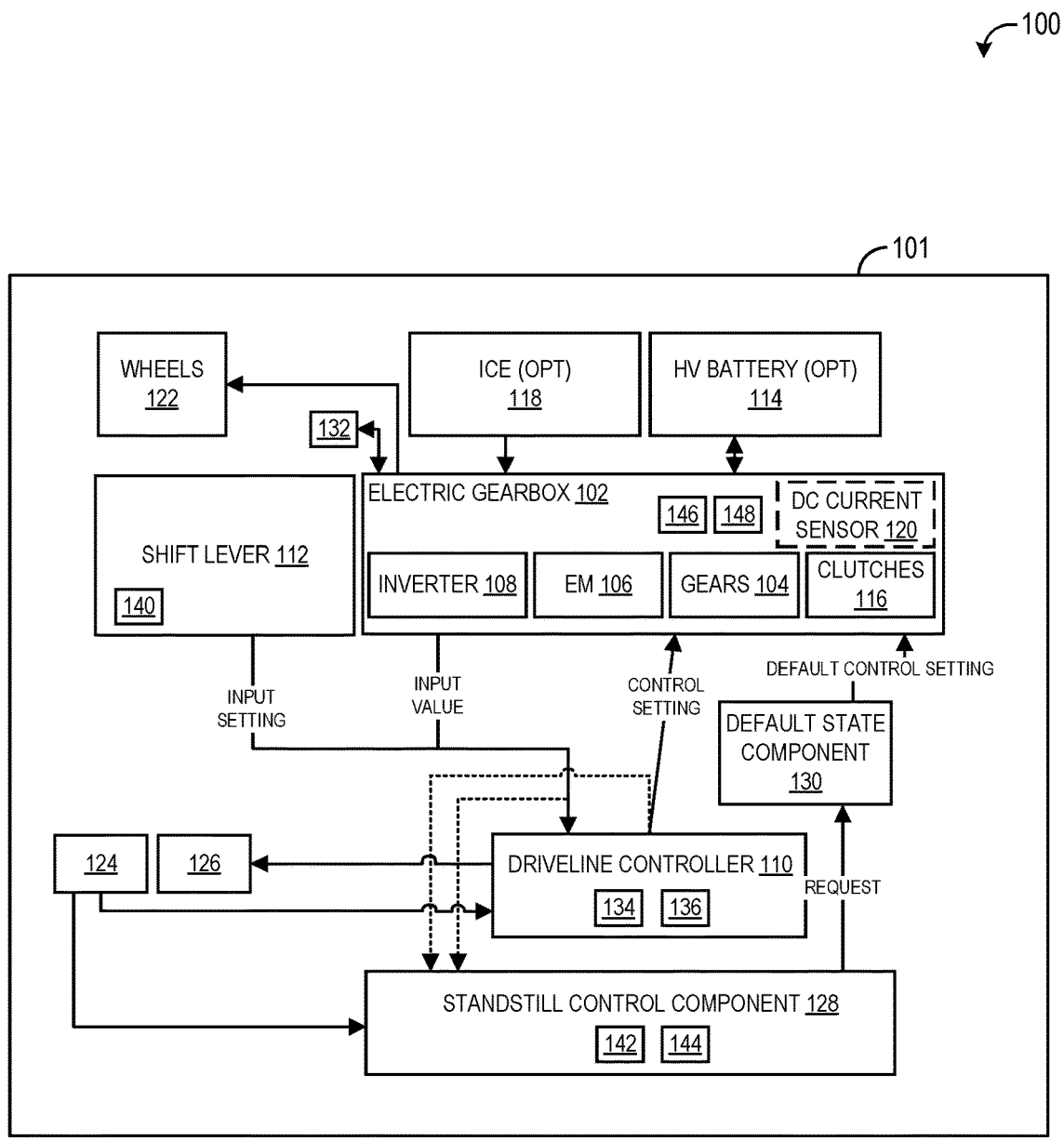
FIG. 1 is a schematic diagram of a vehicle having a standstill control system.
Figure 2:
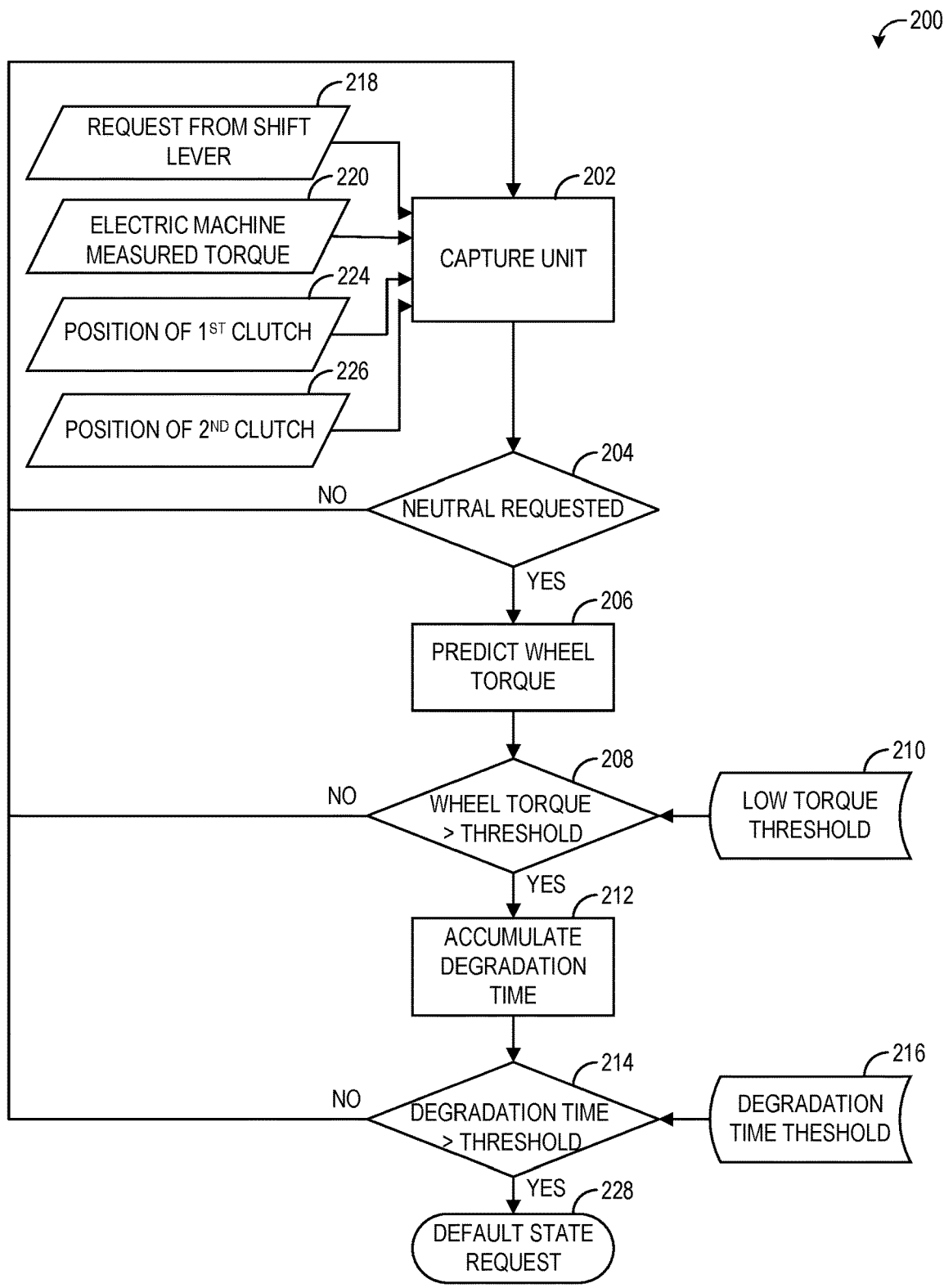
FIG. 2 is a flow chart illustrating a first method for controlling movement at standstill for a vehicle having an electric engine.
Figure 3:
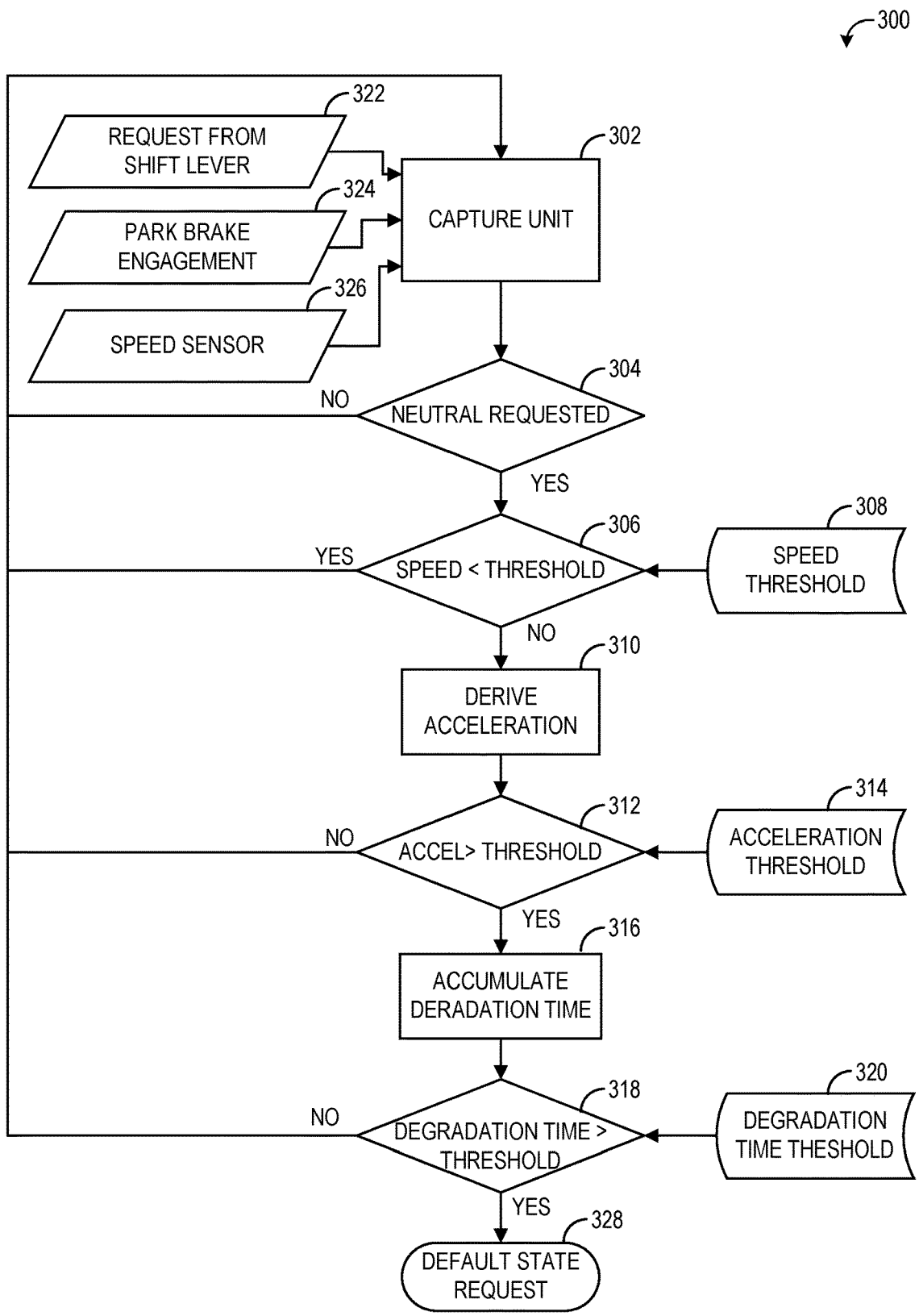
FIG. 3 is a flow chart illustrating a second method for controlling movement at standstill for a vehicle having an electric engine.
Figure 4:
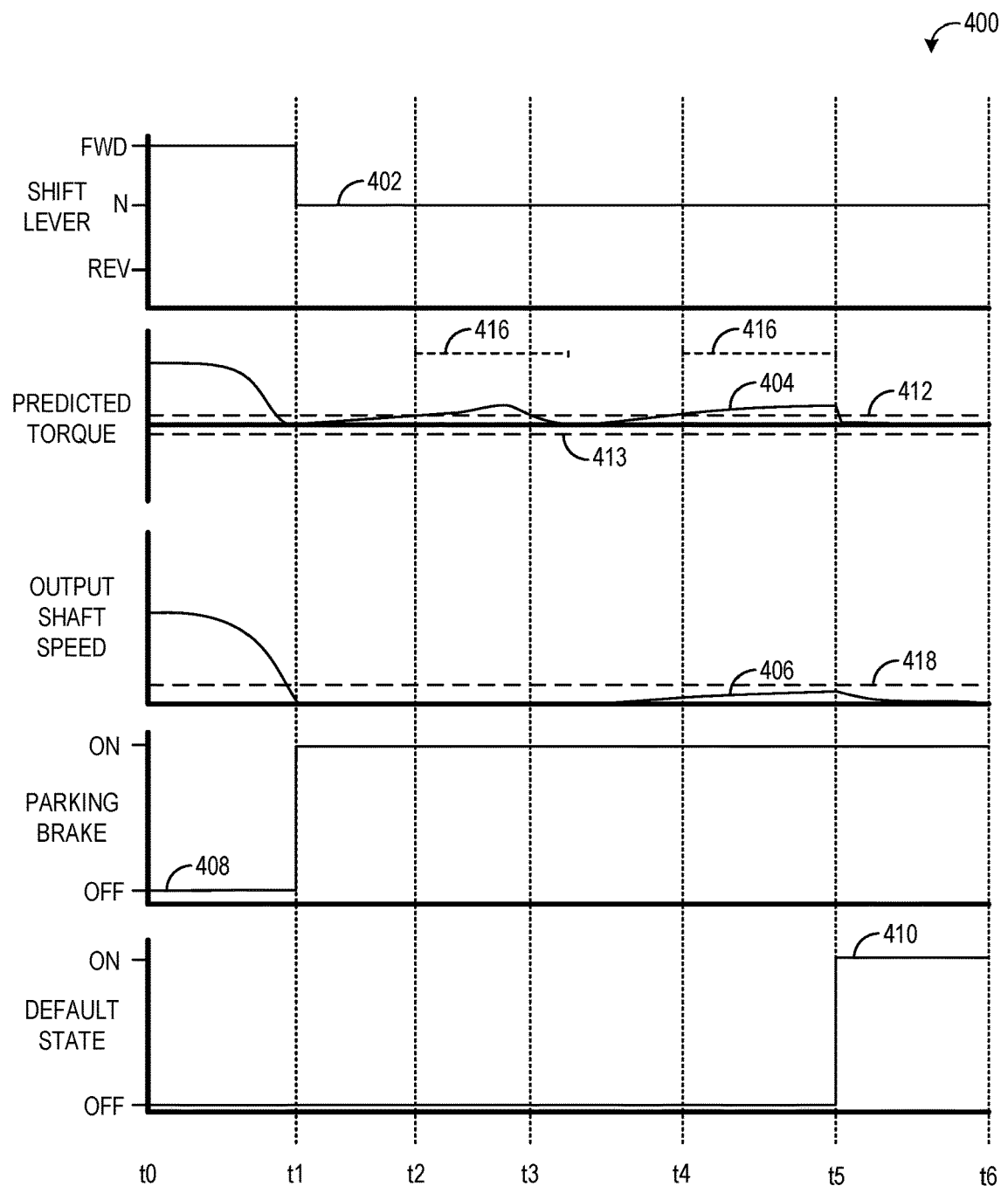
FIG. 4 is a timing diagram for a first prophetic operation of a method for controlling movement at standstill.
Figure 5:
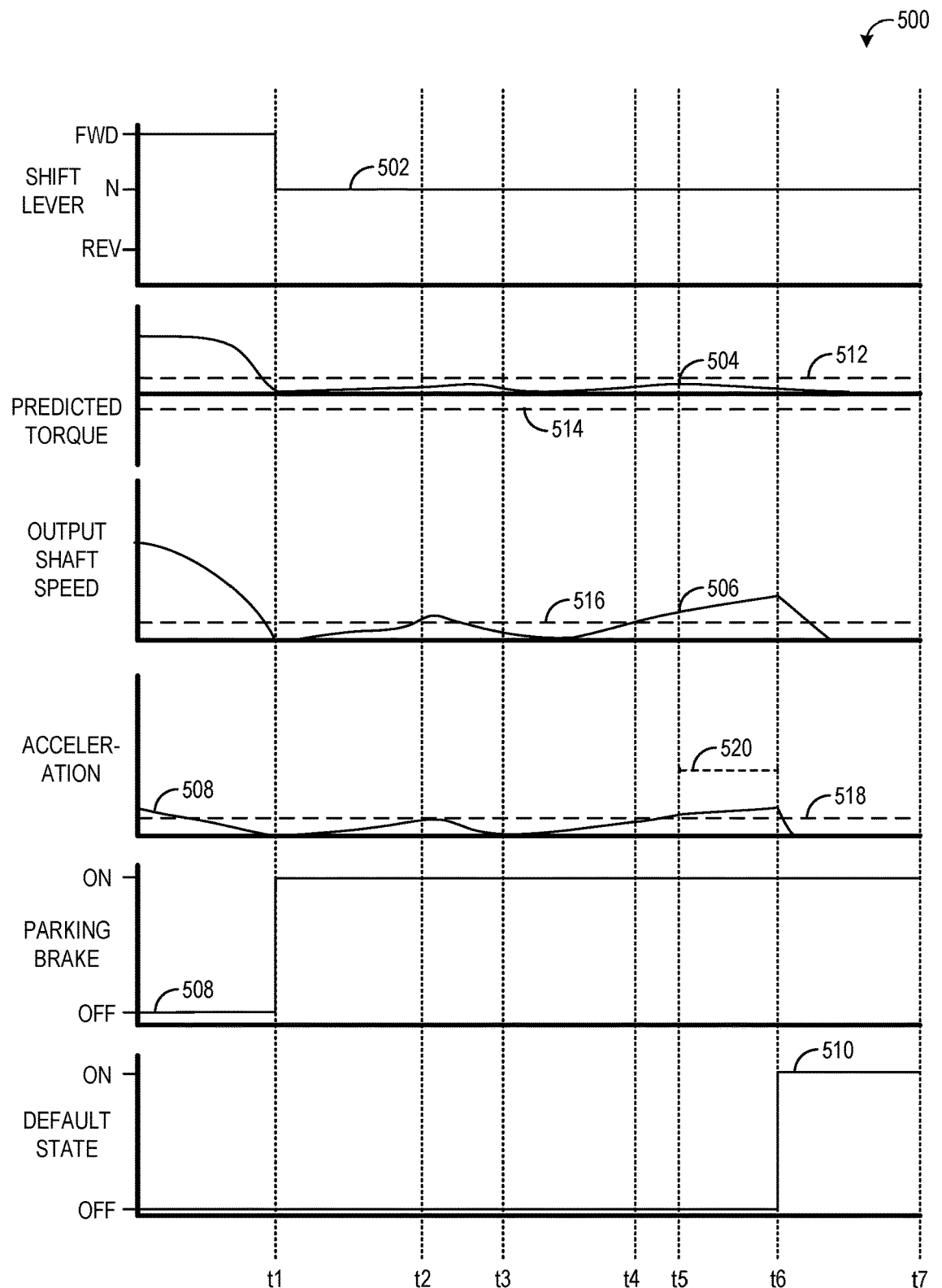
FIG. 5 is a timing diagram for a second prophetic operation of a method for controlling movement at standstill.

FIG. 1 is a schematic diagram of a standstill control system for a vehicle having an electrified driveline, a shift lever for selecting a gear setting of the electrified driveline, a dedicated driveline controller, and a standstill control component for monitoring the vehicle at standstill. FIG. 2 is a flow chart illustrating a first strategy for movement control including torque monitoring. The first strategy may include determining whether at a standstill the driveline is providing torque to an output shaft of the electric motor. If it is determined that torque greater than a threshold torque is being provided to the output shaft, the strategy may include transitioning the vehicle from a running state to a default state. FIG. 3 is flow chart illustrating a second strategy for movement control including speed monitoring and a third strategy including verifying a park brake setting. The second strategy may include determining whether at standstill a reported speed of the vehicle remains below a threshold speed (e.g., very low, near zero), or if the speed exceeds the threshold speed that the vehicle is decelerating. If the reported speed exceeds the threshold and the vehicle is not decelerating, the strategy may include operating the vehicle in a default state, similarly as described with respect to the first strategy. The park brake setting may be used to differentiate between desired and undesired acceleration. FIG. 4 and FIG. 5 show timing diagrams illustrating prophetic examples of the strategies disclosed herein.

FIG. 1 illustrates a standstill control system 100 for a vehicle 101. Standstill control system 100 includes a driveline component or electric gearbox 102. The electric gearbox 102 includes a set of mechanical gears 104, one or more electric machines or electric machine 106, and an inverter 108 for controlling torque and speed of an output shaft of the electric machine 106. The standstill control system 100 includes a driveline controller 110 communicatively coupled to the electric gearbox 102. The standstill control system 100 may include a gear shift lever 112 communicatively coupled to the driveline controller 110. A driver may adjust the gear shift lever 112 to select an input setting of the electric gearbox 102 and the driveline controller 110 may adjust a control setting the electric gearbox 102 realize the selected setting. The inverter 108 may provide the actual (e.g., measured) torque provided by the electric machine 106. Additionally or alternatively, a DC current sensor 120 may be included for estimating a torque output of the electric gearbox 102.

In some examples, vehicle 101 may be a hybrid vehicle with multiple sources of torque available to one or more of a plurality of wheels 122. In some examples, vehicle 101 is an electric vehicle with the electric machine 106. Electric machine 106 may receive electrical power from a high voltage (HV) battery 114 to provide torque to wheels 122. Electric machine 106 may also be operated as a generator to provide electrical power to HV battery 114, for example during a braking operation. In the other examples, vehicle 101 includes internal combustion engine or engine 118. Engine 118 and the electric machine 106 are connected via electric gearbox 102 to wheels 122 when one or more clutches 116 are engaged. Driveline controller 110 may send a signal to an actuator of each of clutches 116 to engage or disengage the clutch, so as to connect or disconnect engine 118 from electric machine 106 and the components connected thereto, and/or connect or disconnect electric machine 106 from electric gearbox 102 and the components connected thereto.

Driveline controller 110 may include a processor 134 operatively connected to a memory 136. The memory 136 may be a non-transitory computer-readable medium and may be configured to store executable instructions (e.g., computer executable code) to be processed by the processor 134 in order to execute one or more routines. The memory 136 may also be configured to store data received by the processor 134. Driveline controller 110 may be communicatively coupled (e.g., via wired or wireless connections) to one or more external or remote computing devices, such as a standstill control component 128, and may be configured to send and receive various information, such as a status of the driveline, and so forth. Driveline controller 110 may also be communicatively coupled to various other components of the standstill control system 100.

Driveline controller 110 receives signals from the various sensors 124 of FIG. 1 and employs the various actuators 126 of FIG. 1 to adjust system operation based on the received signals and instructions stored on the memory 136 of the driveline controller. Sensors of the system may include one or more of a clutch position sensor 146, one or more of an output shaft speed sensor 148, such as a Hall Effect sensor, and so on. As one example, driveline controller 110 may receive signals from a shift lever position sensor 140 for sensing a selected position of the gear shift lever 112. In response to an indication of a selected position of the gear shift lever 112, driveline controller 110 may adjust a position of the one or more clutches via the actuators 126 to realize the selected gear. As another example, driveline controller 110 may control a setting of the inverter 108 of the electric gearbox 102 based on signals received from various sensors of the vehicle 101.

The standstill control component 128 may be in electronic communication with the driveline controller 110, the gear shift lever 112, the electric gearbox 102, and other actuators 126, and sensors 124 of the standstill control system 100, such as the output shaft speed sensor 148 and the shift lever position sensor 140. In one example, the standstill control component 128 may comprise two parallel and independent chains of logic for monitoring and reducing vehicle movement. In one example, the standstill control component 128 may act as an independent controller, e.g., distinct or separate from the driveline controller 110, to maintain the vehicle stationary at standstill. For example, the standstill control component 128 may include a processor 142 operatively connected to a memory 144. Standstill control component 128 may be communicatively coupled (e.g., via wired or wireless connections) to a default state component 130.

In one example, the memory 144 of the standstill control component 128 may include instructions for executing standstill control strategies. For example, in response to the driver selecting neutral via the gear shift lever 112, instructions on the memory 144 may cause the standstill control component 128 to execute control strategies such as the exemplary methods described with respect to FIG. 2 and FIG. 3 for controlling vehicle movement at standstill by monitoring and responding to driveline control signals indicating vehicle movement. In some examples, the driveline control signals may be transmitted directly to the standstill control component 128 from sensors monitoring the torque, output shaft speed, and park brake status of the electric gearbox 102. In other examples, the driveline control signals may be transmitted to the standstill control component 128 via the driveline controller 110.

In one example, the standstill control component 128 may monitor the actual torque of the inverter 108, or alternatively, a signal of the DC current sensor 120, multiplied by the selected gear as indicated by the clutch position sensor 146. As another example, the standstill control component 128 may monitor the output shaft speed sensor 148 of the electric machine 106. As a further example, the standstill control component 128 may monitor an engagement status of the park brake 132. In one example, in response to an indication of at least one of the predicted torque exceeding a threshold torque, an indication of acceleration exceeding a threshold acceleration, and a status, e.g., engagement, of the park brake 132, the standstill control component 128 may request that the default state component 130 operate the vehicle in a default state. As one example, the standstill control component 128 may request that the default state component 130 transition the vehicle from a running state to a default state by reducing or preventing torque transfer from the power source to the wheels 122 of the vehicle 101. In some examples, the standstill control component 128 operating independently, e.g., isolated, from the driveline controller 110 may increase the reliability of the standstill control system 100. Moreover, independent control increases efficiency of the control system by reducing a breadth of tasks to a tailored objective assigned to the standstill control component 128.

In other examples, the standstill control component 128 may be integrated into the driveline controller 110 and act as a logical independent component. In some examples, driveline systems may be adapted to the disclosed system by programming instructions for executing the standstill control component 128, e.g., as a programmed logical system or module, into a memory of a driveline controller. Whether configured as a separate controller or integrated with the driveline controller 110, the default state component 130 may have priority over, e.g., override, a control setting of the driveline controller 110, e.g., as indicated by the gear shift lever 112. For example, the default state component 130 may transition the driveline to a default state based on an output command of the standstill control component 128. In some examples, the default state may include removing all or most of the applied torque on the wheels 122 by removing the closing force of the clutches 116 to an opened state, whereby there is no torque transfer from the power source to the wheels 122. As another example, the default state may include triggering a six phase open of the inverter 108. As a further example, the default state may include cutting the HV battery 114 power by opening an HV contactor.

Example system logic for operating a standstill control system for a hybrid or electric vehicle are shown in FIG. 2 and FIG. 3. FIG. 2 shows an example method 200 for monitoring a predicted torque of the electric vehicle system to reduce movement at standstill. FIG. 3 shows an example of a method 300 for monitoring a speed of the electric vehicle system to reduce movement at standstill. In one example, instructions for carrying out method 200 and method 300 may be executed by an independent standstill controller (e.g., standstill control component 128) based on instructions stored on a memory of the controller and in conjunction with signals received from sensors of the vehicle system (e.g., sensors 124, DC current sensor 120, inverter 108, shift lever position sensor 140, output shaft speed sensor 148, clutch position sensor 146) described above with reference to FIG. 1. The controller may employ actuators of the vehicle system (e.g., actuators 126) to adjust system operation, according to the methods described below. For example, the controller may command the vehicle in a default state in response to an indication of one or more of greater than threshold predicted torque and greater than threshold vehicle speed. In one example, method 200 and method 300 may be executed repeatedly, e.g., cyclically, and concurrently during vehicle operation to reduce vehicle movement while the vehicle is stationary, e.g., parked, at rest, etc.

Turning now to FIG. 2, method 200 illustrates an example system logic for controlling movement at standstill for a hybrid or electric vehicle having a standstill control system, such as the example in FIG. 1. At 202, the method 200 may include a capture unit for collecting vehicle data. In one example, the capture unit may receive vehicle data during vehicle operation. Collected data may include receiving a position of the shift lever indicating a neutral request 218. Collected data may include a measured torque 220 applied by the electric machine. As one example, the measured torque signal may be indicated by the inverter of the electric machine. Additionally or alternatively, a DC current sensor may detect and relay actual torque to the capture unit. As another example, the capture unit may collect data indicating a position of a first clutch 224 and the position of a second clutch 226. In some examples, the capture unit may receive a validity indication for each input value of the collected data and pass the value to the standstill controller such as standstill control component 128 shown in FIG. 1.

At 204, the method may include determining whether neutral is requested by the driver of the vehicle. If yes, the method continues to 206. If neutral is not requested by the driver, the method returns to 202 to start a new execution cycle.

At 206, the method may include predicting wheel torque. In one example, a wheel torque prediction may be calculated from the measured torque 220. If the calculation for predicting wheel torque relies on a DC current sensor signal, the calculation may include the position of the first clutch 224, the position of the second clutch 226, and geometry of the gearbox. In some examples, the applied torque at the wheels may be zero, such as may be the case with a neutral clutch in an open position.

At 208, the method may include determining whether the predicted wheel torque exceeds a threshold torque. The threshold torque may be a pre-set, nonzero, threshold such as a low torque threshold 210. As another example, the threshold torque may be a value less than estimated to move the vehicle on a flat surface. If the predicted wheel torque does not exceed the threshold torque, the method returns to 202 to start a new execution cycle.

At 212, if the predicted wheel torque exceeds the threshold torque, the method may include accumulating a degradation time from a degradation tolerant unit. The degradation tolerant unit monitors a duration of time passed since the degradation occurred.

At 214, the method may include determining whether the accumulated degradation time exceeds the degradation time threshold 216. The degradation time threshold may be a pre-set, nonzero threshold duration. In one example, the degradation time threshold may be a first threshold duration for evaluating the duration of a degraded torque signal. As one example, the degradation time threshold may be set to a time of sufficient duration to reduce an influence of noise on predicted torque. If predicted wheel torque exceeds threshold torque for longer than the degradation time threshold, the method may continue to 228. If predicted wheel torque exceeds threshold torque for less than the degradation time threshold, the method may include nullifying the indication. The method returns to 202 to start a new execution cycle.

At 228, the method may include requesting a default state. The default state may be realized by either reducing all or most of the applied torque on the wheels. As one example, the controller 10 may command the default state by generating a control signal that is sent to the clutches 116 to bring them to an opened state, whereby there is no torque transfer from the power source to the plurality of wheels 122. As another example, the controller 10 may command the default state by generating a control signal that is sent to the inverter 108 to open all insulated gate bipolar transistors (called a six-phase open), or to short the inverter (depending on the motor-generator speed), whereby the motor-generator is put in a torque-free state. As another example, the controller 10 may command the default state. As another example, the controller 10 may command the default state by generating a control signal that is sent to the HV battery 114 to cut power to the electric machine 106.

Turning now to FIG. 3, method 300 illustrates an example system logic for controlling movement at standstill for a hybrid or electric vehicle having a standstill control system, such as the example in FIG. 1. The method may begin at 302 where a capture unit may collect vehicle data. In one example, the capture unit may receive vehicle data during vehicle operation such as while driving and stationary. Collected data may include a request from e.g., a position of, the shift lever 322. Data may include a status of park brake engagement 324 e.g., engaged or not engaged. As another example, the capture unit may collect data from a speed sensor 326 for measuring an actual speed of the vehicle. For example, the speed sensor 326 may measure the speed of rotation of the output shaft of an electric machine (e.g., electric machine 106). As another example, the speed sensor 326 may measure the wheel speed of rotation. In some examples, the capture unit may receive a validity indication for each input value of the collected data and pass the value to the standstill control component.

At 304, the method may include determining whether a torque-less state is requested by the driver of the vehicle by putting the shift lever in neutral. If yes, the method continues to 306. If neutral is not requested by the driver, the method returns to 302 to start a new execution cycle. In one example, the park brake engagement status is verified at 304. The park brake status may be used to determine a speed threshold at 308 below.

At 306, the method may include determining whether the vehicle speed exceeds a threshold speed 308. The threshold speed may be a pre-set, nonzero threshold. As one example, the threshold speed may be a very low threshold, e.g., near standstill. If vehicle speed exceeds the threshold speed, the method continues to 310. If the vehicle speed is less than the threshold speed, the method returns to 302 to start a new execution cycle. As another example, the park brake status may be used to verify whether movement is desired in neutral. In some examples, with neutral requested, the vehicle may be at standstill or decelerating. However, in some examples, neutral may be requested on a (strong) slope to intentionally produce acceleration. To evaluate whether the acceleration is desired in neutral, feedback from park brake status may be evaluated. As one example, if neutral is requested and the park brake is engaged, the speed threshold may be near 'standstill' or decreasing. If neutral is requested and the park brake is not engaged, the method may include increasing or overriding the speed threshold. In one example there may not be a request on the enforced automatic engagement of the park brake. Rather, the park brake engagement is used as feedback.

At 310, the method may include deriving an acceleration from the vehicle speed signal. For example, the method may include receiving an initial speed signal and a final speed signal over a threshold time. The acceleration may be difference between the final speed signal and initial speed signal over the threshold time.

At 312, the method may include determining whether the vehicle is decelerating or the acceleration is less than an acceleration threshold 314. The acceleration threshold may be a pre-set, nonzero threshold. For example, the acceleration threshold may be a very low threshold. If the acceleration is less than the acceleration threshold or decelerating speed is indicated, the method returns to 302 to start a new execution cycle.

At 316, if the acceleration exceeds the acceleration threshold, the method may include accumulating a degradation time from a degradation tolerant unit. The degradation tolerant unit monitors a duration of time passed since the degradation occurred.

At 318, the method may include determining whether the accumulated degradation time exceeds the degradation time threshold 320. The degradation time threshold may be a pre-set, nonzero threshold. In one example, the degradation time threshold may be a second threshold duration for evaluating the duration of a degraded acceleration signal. In one example, the second threshold duration may be a different length than the first threshold duration (e.g., see 214 in FIG. 2). In other examples, the first threshold duration and second threshold durations may be the same or similar lengths. As one example, the degradation time threshold may be set to a time of sufficient length to reduce an influence of noise on the speed measurement and acceleration derivation. If the derived acceleration exceeds the threshold acceleration for longer than the degradation time threshold, the method continues to 328. If the derived acceleration exceeds threshold acceleration for less than the degradation time threshold, or in other words, for less than the second threshold duration, the method may include nullifying the indication. The method returns to 302 to start a new execution cycle.

At 328, the method may include requesting a default state. In one example, default state may be commanded similarly as described above with respect to FIG. 2 such as by various mechanisms to reduce all or most of the applied torque on the wheels.

FIG. 4 and FIG. 5 are timing diagrams illustrating prophetic operation of methods for reducing movement during standstill for a vehicle having a standstill control system. The methods for reducing movement during standstill may be the same or similar to the methods described above with respect to methods 200 and 300 of FIG. 2 and FIG. 3, respectively. The standstill control system for a vehicle maybe the same or similar to the standstill control system 100 shown in FIG. 1. Instructions for performing the methods described in timing diagram 400 and timing diagram 500 may be executed by an independent standstill controller (e.g., standstill control component 128) based on instructions stored on a memory of the standstill controller and in conjunction with feedback received from components of the standstill control system, including an inverter of an electric machine (e.g., inverter 108 of electric machine 106), one or more speed sensors (e.g., output shaft speed sensor 148), a shift lever position sensor (e.g., shift lever position sensor 140) and one or more clutch sensors (e.g. clutch position sensor 146), as described above with respect to FIG. 1. As another example, the instructions may be stored on a memory of a controller such as driveline controller 110. In the prophetic examples, the controller determines whether vehicle movement is indicated by monitoring torque and vehicle speed sensor signals, and responsive to an indication, commands a transition of the vehicle from a running state to a default state. With respect to FIG. 4, timing diagram 400 illustrates a first example where in response to an indication of increasing predicted torque of the vehicle, the vehicle is operated in the default state. With respect to FIG. 5, timing diagram 500 illustrates a second example where in response to an indication of increasing output shaft speed of the vehicle, the vehicle is operated in the default state.

Timing diagram 400 shows plots 402, 404, 406, 408, and 410, which illustrate components and/or control settings of the movement control system over time. Plot 402 indicates a position of the shift lever. A driver may select one of forward, reverse, and neutral drive modes via the shift lever. Shift lever position is sensed by a position sensor in electronic communication with the driveline controller and transmitted to the standstill control component. Plot 404 indicates predicted torque on the wheels of the vehicle. The inverter of the electric machine provides the actual torque to the standstill controller and the standstill controller calculates the predicted torque from the actual torque. A first threshold torque 412 (positive torque) and second threshold torque 413 (negative torque) are given. The first threshold torque 412 may be a very low positive torque (e.g., 10 lb-ft) and the second threshold torque may be a very low negative torque (e.g., −10 lb-ft). If predicted torque exceeding the first or second threshold torque is detected, the standstill control component may trigger timed degradation verification by a degradation tolerant unit (e.g., see 212 in method 200). Degradation verification threshold time 416 is indicated by horizontal dashed lines. Plot 406 indicates a speed of the output shaft as measured by an output shaft speed sensor. A threshold speed 418 is given. The threshold speed 418 may be a very low speed (e.g., 1 mile per hour [mph]). Parking brake status is indicated in plot 408. In the prophetic example, in response to predicted torque exceeding the first or second threshold torque for greater than the degradation verification threshold time 416, the default state module may be commanded to put the vehicle in a default state. Default state status is indicated in plot 410. Plot 404 and plot 406 increase upwards along the y-axis. The horizontal axis (x-axis) denotes time and the vertical markers t0-t6 identify relevant times in the timing diagram 400 for reducing vehicle movement at standstill.

At t0, the shift lever in plot 402 is set at forward drive. Predicted torque is positive in plot 404 (e.g., 200 lb-ft). The output shaft speed is moderate in plot 406 (e.g., 20 mph). The parking brake is off in plot 408. The default state is off in plot 410.

From t0 to t1, the driver is driving forward while reducing vehicle speed. Predicted torque in plot 404 reduces in response to the reducing actual torque request from the motor.

At t1, predicted torque and output shaft speed reduce to zero. The driver adjusts the shift lever to neutral in plot 402 and engages the parking brake in plot 408. The default state is not active.

From t1 to t2, the vehicle remains in neutral gear with the parking brake on. A degraded electrical signal increases the actual torque request to the electric machine. In response, the predicted torque begins to increase in plot 404. Output shaft speed remains at or very near zero in plot 406.

At t2, the predicted torque increases above the first threshold torque. For example, the predicted torque is 11 lb-ft. In response to the predicted torque exceeding the first threshold torque, the degradation tolerant unit initiates monitoring a duration of time passed since the degradation occurred. Degradation verification threshold time 416, e.g., 10 seconds, is set starting at t2 in plot 404.

From t2 to t3, the degradation tolerant unit monitors the predicted torque in plot 404. As time approaches t3, the predicted torque decreases in the direction of the first threshold torque. At t3, the predicted torque reduces below the first threshold torque 412. The degradation tolerant unit detects predicted torque exceeding the first threshold torque for less than the degradation time threshold, e.g., from t2 to t3. Therefore, the default state is not commanded. The standstill controller continues to monitor torque, speed, and parking brake status while the vehicle remains at standstill.

From t3 to t4, the position of the shift lever remains in neutral in plot 402 and the parking brake is engaged in plot 408. The predicted torque increases in plot 404. The output shaft speed increases in plot 406.

At t4, the predicted torque increases above the first threshold torque 412 in plot 404. For example, the predicted torque is 12 lb-ft. In response to the predicted torque exceeding the first threshold torque, the degradation tolerant unit initiates monitoring a duration of time passed since the degradation occurred. The degradation verification threshold time 416, e.g., 10 seconds, is set starting at t4 in plot 404.

From t4 to t5, the degradation tolerant unit monitors the predicted torque in plot 404. As time approaches t5 and the degradation verification threshold time 416, the predicted torque remains above the first threshold torque 412. In response, the default state is commanded at t5.

From t5 to t6, torque transmission from the electric machine to the wheels is stopped. Based on the default state request commanded by the driveline module, the controller generates a control signal that is sent to the electric gearbox to open the clutches. In response to the opened clutches, the predicted torque steeply declines to below the first threshold torque to zero. Similarly, the output shaft speed steeply declines to zero.

Turning now to FIG. 5, timing diagram 500 shows plots 502, 504, 506, 508, and 510, which illustrate components and/or control settings of the standstill control system over time. Plot 502 indicates a position of the shift lever. The driver may select one of forward, reverse, and neutral drive modes via the shift lever. Shift lever position is sensed by a position sensor in electronic communication with the driveline controller and transmitted to the standstill controller. Plot 504 indicates predicted torque on the wheels of the vehicle based on the actual torque measured inverter of the electric machine. First threshold torque 512 (positive torque) and second threshold torque 514 (negative torque) are given. Similar to the example given in FIG. 4, the first threshold torque 512 may be a very low positive torque (e.g., 10 lb-ft) and the second threshold torque 514 may be a very low negative torque (e.g., −10 lb-ft). Plot 506 indicates output shaft speed as measured by the output shaft speed sensor. A threshold speed 516 is given. The threshold speed 516 may be a very low speed (e.g., 1 mile per hour [mph]). In response to the output shaft speed exceeding the threshold speed, the standstill controller derives the acceleration from the output shaft speed. In response to the derived acceleration exceeding a threshold acceleration 518 and not detecting deceleration, the standstill controller triggers a timed degradation verification by the degradation tolerant unit. The degradation verification threshold time 520 is indicated by horizontal dashed lines. Parking brake status is indicated in plot 508. Parking brake status may be used to determine whether acceleration in neutral is desired. In the prophetic example, in response to acceleration exceeding the threshold acceleration for greater than the degradation verification threshold time 520, the default state component (e.g., default state component 130) may be requested to put the vehicle in a default state. Default state status is indicated in plot 510. Plot 504, plot 506, and plot 508 increase upwards along the y-axis. The horizontal axis (x-axis) denotes time and the vertical markers t0-t7 identify relevant times in the timing diagram 500 for reducing vehicle movement at standstill.

At t0, the shift lever in plot 502 is set at forward drive. Predicted torque is positive in plot 504 (e.g., 210 lb-ft). The output shaft speed is moderate in plot 506 (e.g., 20 mph). The parking brake is off in plot 408. The default state is off in plot 410.

From t0 to t1, the driver is driving forward while reducing vehicle speed. Predicted torque in plot 504 reduces in response to the reducing actual torque request from the electric machine. The output shaft speed in plot 506 declines toward zero.

At t1, predicted torque and output shaft speed reduce to zero. The driver adjusts the shift lever to neutral in plot 502 and engages the parking brake in plot 508. The default state is not active.

From t1 to t2, the vehicle remains in neutral gear with the parking brake on. A degraded electrical signal increases the actual torque request to the electric machine. In response, the speed of the output shaft of the electric machine increases in plot 506. Predicted torque increases in plot 504.

At t2, the output shaft speed increases above the first threshold torque to 1.2 mph. The standstill controller uses the engaged status of the parking brake as an indication that increasing speed in neutral is not desired. In response to the speed exceeding the threshold speed, the standstill controller derives acceleration from the output shaft speed from t2 to t3. As time approaches t3, the standstill controller determines the output shaft speed is decelerating. At t3, the standstill controller determines the output shaft speed is less than the threshold acceleration 518. Monitoring of the output shaft speed, predicted torque, and park brake status resume while the vehicle remains at standstill.

From t3 to t4, the position of the shift lever remains in neutral in plot 502 and the parking brake is engaged in plot 508. In response to the degraded electronic signal, the increasing actual torque provided by the electric machine increases the output shaft speed increases in plot 506 and predicted torque in plot 504.

At t4, the output shaft speed increases above the threshold speed 516 in plot 504. For example, the speed is 1.1 mph. The standstill controller uses the engaged status of the parking brake as an indication that increasing speed in neutral is not desired. In response to the output shaft speed exceeding the threshold speed, the standstill controller derives acceleration from the output shaft speed from t4 to t5. As time approaches t5, the derived acceleration increases.

At t5, the standstill controller determines the derived acceleration exceeds the threshold acceleration 518 and is not decelerating. In response, the degradation tolerant unit initiates monitoring a duration of time passed since the degradation, e.g., greater than threshold acceleration, occurred. The degradation verification threshold time 520, e.g., 5 seconds, is set starting at t5 in plot 508.

From t5 to t6, the degradation tolerant unit monitors the acceleration in plot 508. As time approaches t6 and the degradation verification threshold time 520, the acceleration remains above the threshold acceleration 518. In response, the default state is requested at t6.

From t6 to t7, current to the electric machine is stopped. Based on the default state request commanded by the standstill controller, the driveline controller generates a control signal that is sent to the HV contactor of the battery. With current to the electric machine stopped, the output shaft speed steeply declines to below the threshold speed to zero. Similarly, the predicted torque and derived acceleration decline to zero.

In this way, in response to the vehicle movement indicated by an increasing output shaft speed or increasing predicted torque while the driver has indicated a neutral gear, the vehicle may be transitioned from a running state to a default state. By operating the vehicle in the default state, torque transfer from the power source to the wheels is stopped and vehicle movement is reduced. An additional level of movement control and movement reduction may include operating the vehicle in a default state in response to the vehicle in a neutral gear with the parking brake engaged. An advantage of the disclosed system and methods is that the standstill monitoring may be operated separate from the driveline control system. In response to conditions indicating movement at standstill, the default state may be commanded having priority over an existing setting indicated by the driveline controller. In other examples, standstill monitoring may be integrated with the driveline control system while retaining independent and priority functionality. By operating concurrent, independent strategies control of movement at standstill is increased for a hybrid or electric vehicle system. The technical effect of the systems and methods disclosed herein is efficient and reliable movement control.

The disclosure also provides support for a method for a hybrid or electric vehicle comprising: monitoring a requested torque of an electric machine and a clutch position, predicting a torque at an output shaft by multiplying the requested torque and clutch position, and operating the hybrid or electric vehicle in a default state in response to an indication of a predicted torque exceeding a threshold torque. In a first example of the method, monitoring includes measuring the torque requested by an inverter of the electric machine. In a second example of the method, optionally including the first example, monitoring includes measuring a DC current to the electric machine. In a third example of the method, optionally including one or both of the first and second examples, the method further comprises: nullifying the indication of exceeding threshold torque in response to the predicted torque exceeding the threshold torque for less than a first threshold duration. In a fourth example of the method, optionally including one or more or each of the first through third examples, the threshold torque is the torque estimated to move the hybrid or electric vehicle on a flat surface. In a fifth example of the method, optionally including one or more or each of the first through fourth examples, the method further comprises: monitoring a speed of the hybrid or electric vehicle, deriving an acceleration of the hybrid or electric vehicle in response to an indication of the speed exceeding a threshold speed, and operating the hybrid or electric vehicle in the default state in response to an indication of acceleration being greater than a threshold acceleration. In a sixth example of the method, optionally including one or more or each of the first through fifth examples, the method further comprises: monitoring a status of park brake engagement. In a seventh example of the method, optionally including one or more or each of the first through sixth examples, the method further comprises: nullifying the indication of greater than threshold acceleration in response to the acceleration exceeding the threshold acceleration for a less than a second threshold duration. In an eighth example of the method, optionally including one or more or each of the first through seventh examples, operating the hybrid or electric vehicle in the default state includes reducing torque transfer from the electric machine to a plurality of wheels of the hybrid or electric vehicle. In a ninth example of the method, optionally including one or more or each of the first through eighth examples, operating the hybrid or electric vehicle in the default state includes triggering an open six phases of an inverter of the electric machine.

The disclosure also provides support for a method for a vehicle having an electric machine comprising: monitoring a torque requested by an inverter of the electric machine and a clutch position, predicting the torque at an output shaft by multiplying a requested torque and clutch position, monitoring a speed of the vehicle, deriving an acceleration of the vehicle in response to an indication of the speed exceeding a threshold speed, and operating the vehicle in a default state in response to the indication of at least one of the predicted torque exceeding a threshold torque and the acceleration exceeding a threshold acceleration. In a first example of the method, operating the vehicle in the default state includes shutting off battery power to the electric machine. In a second example of the method, optionally including the first example, the method further comprises: nullifying the indication of greater than threshold acceleration in response to an indication of decelerating speed. In a third example of the method, optionally including one or both of the first and second examples, the method further comprises: monitoring an engagement status of a park brake. In a fourth example of the method, optionally including one or more or each of the first through third examples, the method further comprises: operating the vehicle in the default state in response to the engagement status of the park brake indicating engagement.

The disclosure also provides support for a standstill control system for a vehicle, comprising: an electric driveline having an inverter of an electric machine and a clutch, a controller communicatively coupled to the electric driveline, a vehicle speed sensor coupled to the controller, and a memory storing executable instructions that, when executed, cause the controller to monitor a torque requested by the inverter of the electric machine and a position of the clutch, predict the torque at an output shaft by multiplying a requested torque and the position of the clutch, monitor a speed of the vehicle, derive an acceleration of the vehicle in response to an indication of the speed exceeding a threshold speed, and operate the vehicle in a default state in response to an indication of at least one of the predicted torque exceeding a threshold torque and the acceleration exceeding a threshold acceleration. In a first example of the system, the system further comprises: a park brake. In a second example of the system, optionally including the first example, the system further comprises: a driveline controller. In a third example of the system, optionally including one or both of the first and second examples, the default state has priority over a setting of the driveline controller. In a fourth example of the system, optionally including one or more or each of the first through third examples, the system further comprises: an internal combustion engine.

In another representation, a method for a hybrid or electric vehicle comprising: receiving a position of a gear shift lever; receiving a measured torque of an electric machine; and, receiving a speed signal; and, in response to the gear shift lever indicating neutral; predicting an output shaft torque from the measured torque; deriving an acceleration in response to an indication of the speed signal exceeding a speed threshold; and operating the vehicle in a default state in response to an indication of at least one of the predicted torque exceeding a threshold torque for more than a first threshold time and the acceleration exceeding a threshold acceleration for more than a second threshold time.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4 I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid or electric vehicle comprising:
operating the hybrid or electric vehicle in a running state where a control setting of a driveline controller is selected via a gear shift lever;
monitoring a requested torque of an electric machine and a clutch position;
predicting a torque at an output shaft by multiplying the requested torque and clutch position; and
transitioning from operating the hybrid or electric vehicle in the running state to operating in a default state via a default state component that has priority over the control setting of the driveline controller in response to an indication of the predicted torque exceeding a threshold torque.

2. The method of claim 1, wherein monitoring includes measuring the torque requested by an inverter of the electric machine.

3. The method of claim 1, wherein monitoring includes measuring a DC current to the electric machine.

4. The method of claim 1, further comprising nullifying the indication of exceeding threshold torque in response to the predicted torque exceeding the threshold torque for less than a first threshold duration.

5. The method of claim 1, wherein the threshold torque is the torque estimated to move the hybrid or electric vehicle on a flat surface.

6. The method of claim 1, further comprising:
monitoring a speed of the hybrid or electric vehicle;
deriving an acceleration of the hybrid or electric vehicle in response to an indication of the speed exceeding a threshold speed; and
operating the hybrid or electric vehicle in the default state in response to an indication of acceleration being greater than a threshold acceleration.

7. The method of claim 6, further comprising monitoring a status of park brake engagement.

8. The method of claim 6, further comprising nullifying the indication of greater than threshold acceleration in response to the acceleration exceeding the threshold acceleration for a less than a second threshold duration.

9. The method of claim 6, wherein operating the hybrid or electric vehicle in the default state includes reducing torque transfer from the electric machine to a plurality of wheels of the hybrid or electric vehicle.

10. The method of claim 6, wherein operating the hybrid or electric vehicle to the default state includes triggering an open six phases of an inverter of the electric machine.

11. A method for a vehicle having an electric machine comprising:
operating the hybrid or electric vehicle in a running state where a control setting of a driveline controller is selected via a gear shift lever;
monitoring a torque requested by an inverter of the electric machine and a clutch position;
predicting the torque at an output shaft by multiplying a requested torque and clutch position;
monitoring a speed of the vehicle;
deriving an acceleration of the vehicle in response to an indication of the speed exceeding a threshold speed; and
transitioning from operating the vehicle in the running state to operating the vehicle in a default state via a default state component that has priority over the control setting of the driveline controller in response to the indication of at least one of the predicted torque exceeding a threshold torque and the acceleration exceeding a threshold acceleration.

12. The method of claim 11, wherein operating the vehicle in the default state includes shutting off battery power to the electric machine, and further comprising nullifying the indication of greater than threshold acceleration in response to an indication of decelerating speed.

13. The method of claim 11, further comprising monitoring an engagement status of a park brake, and operating the vehicle in the default state in response to the engagement status of the park brake indicating engagement.

14. A standstill control system for a vehicle, comprising:
an electric driveline having an inverter of an electric machine and a clutch;
a driveline controller communicatively coupled to the electric driveline;
a vehicle speed sensor coupled to the driveline controller; and
a memory storing executable instructions that, when executed, cause the driveline controller to:
operate the vehicle in a running state where a control setting of the driveline controller is selected via a shift gear lever;
monitor a torque requested by the inverter of the electric machine and a position of the clutch;
predict the torque at an output shaft by multiplying a requested torque and the position of the clutch;
monitor a speed of the vehicle;
derive an acceleration of the vehicle in response to an indication of the speed exceeding a threshold speed; and
transition operation of the vehicle from the running state to a default state via a default state component that has priority over the control setting of the driveline controller in response to an indication of at least one of the predicted torque exceeding a threshold torque and the acceleration exceeding a threshold acceleration.

15. The standstill control system of claim 14, further comprising a park brake.

16. The standstill control system of claim 14, further comprising an internal combustion engine.

17. The standstill control system of claim 16, wherein transitioning operation of the vehicle from the running state to the default state includes reducing torque transfer from the electric machine and the internal combustion engine to a plurality of wheels of the vehicle.

18. The standstill control system of claim 14, wherein the default state component is commanded to transition operation of the vehicle from the running state to the default state by a standstill control component of the vehicle that operates independently of the driveline controller.

* * * * *